358/105

United States Patent [19]
Fried

[11] Patent Number: 4,639,774
[45] Date of Patent: Jan. 27, 1987

[54] MOVING TARGET INDICATION SYSTEM

[75] Inventor: David L. Fried, Placentia, Calif.

[73] Assignee: D. L. Fried Associates, Inc., Placentia, Calif.

[21] Appl. No.: 747,972

[22] Filed: Jun. 21, 1985

[51] Int. Cl.$^4$ .............................................. H04N 7/18
[52] U.S. Cl. .................................... 358/105; 358/109; 358/113
[58] Field of Search ............... 358/108, 109, 113, 105, 358/125, 199, 209, 213

[56] References Cited

U.S. PATENT DOCUMENTS

| | | | |
|---|---|---|---|
| 4,220,967 | 9/1980 | Ichida | 358/125 |
| 4,245,248 | 1/1981 | Netravali | 358/105 |
| 4,270,143 | 5/1981 | Morris | 358/125 |
| 4,296,436 | 10/1981 | Achiha | 358/105 |
| 4,408,224 | 10/1983 | Yoshida | 358/108 |
| 4,418,360 | 11/1983 | Glasgow | 358/108 |
| 4,581,642 | 4/1986 | Poetsch | 358/105 |

Primary Examiner—Howard W. Britton
Attorney, Agent, or Firm—Harvey C. Nienow

[57] ABSTRACT

A system comprising a scanning detector for rapidly scanning a field of view through appropriate optical means, and with a linear infrared detector array, there being electronic apparatus for converting the detector signals to digital signals and for storing such information for comparison with like information from another or many additional scans. The system further includes electronic apparatus for processing such detector signals from a first scan as well as from second or succeeding scans to determine the amount of misalignment between the frames of such scans to develop a correction signal which is applied to adjustment apparatus to correct such misalignment to insure that the frames of succeeding scans are accurately aligned with frames from previous scans.

16 Claims, 4 Drawing Figures

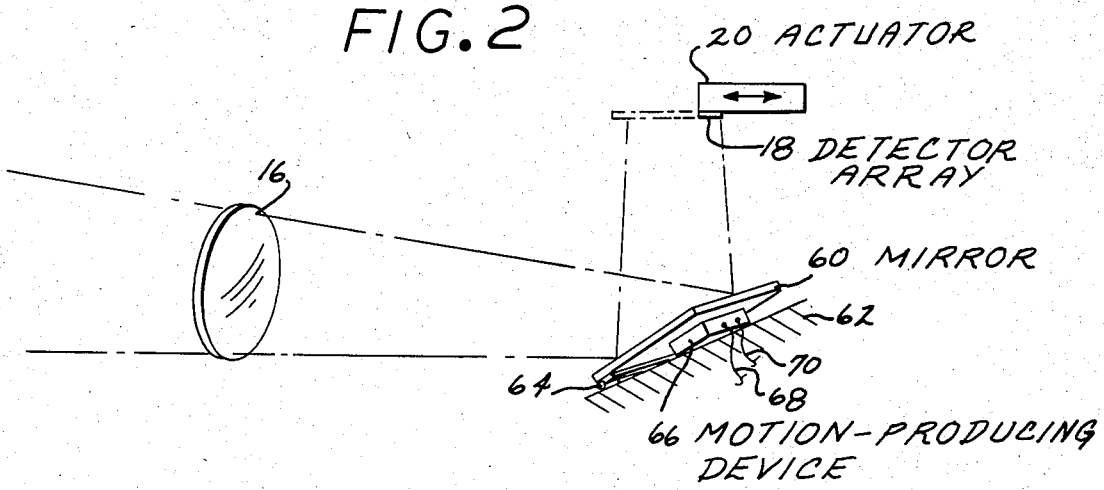
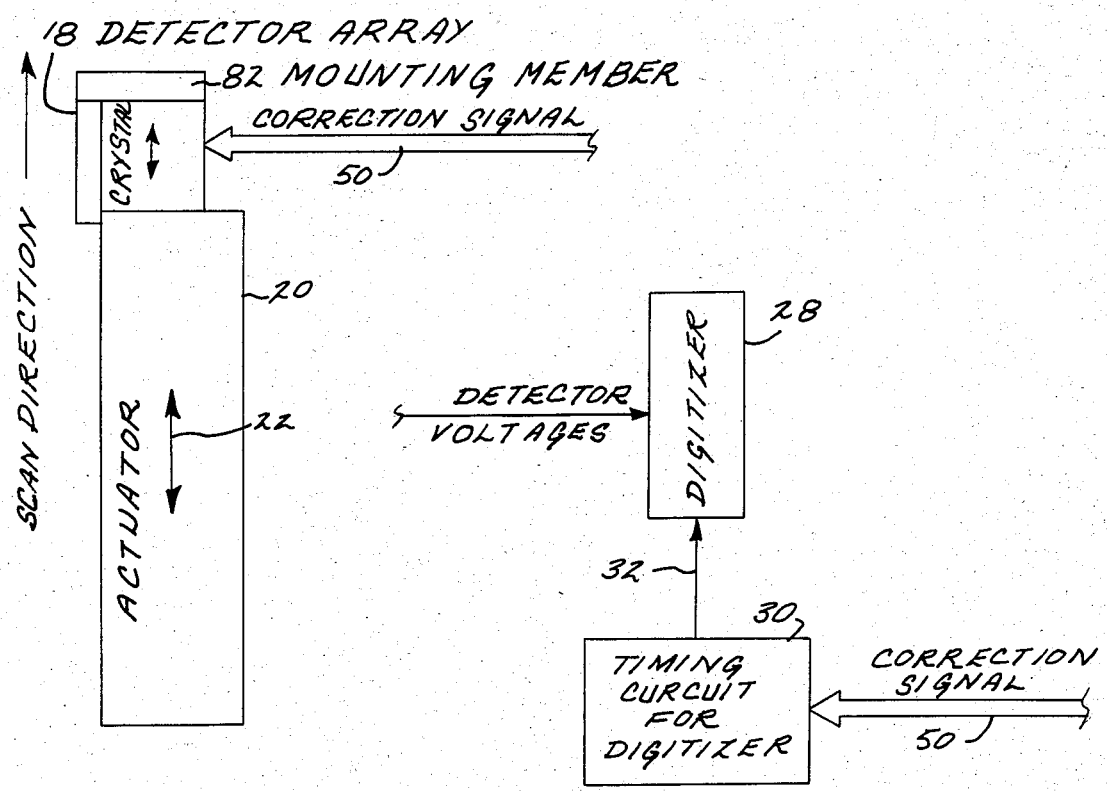

MOVING TARGET INDICATION SYSTEM

The present invention relates generally to moving target indication systems, but more particularly to such systems wherein there is means for insuring alignment or registration of frames from repeated scannings of a field of view to insure the accuracy of the frame-to-frame differencing process.

BACKGROUND OF THE INVENTION

Systems have heretofore been devised for exposing a given field of view to either a mosaic array of detectors, or a scanning linear array of detectors to develop information regarding the characteristics of such field of view. That is, infrared detectors have heretofore been utilized to develop electrical signals as to certain characteristics of such fields in order to develop a record thereof.

A further extension of that basic idea has been to repeat such scanning or gathering of information of a given field of view so as to be able to compare the signal levels from the different frames to thereby enable differences to be detected. Such differences represent an indication of a change in infrared values from one frame to another. This generally indicates motion within such field of view such that something or someone has entered the field, or has moved from one position to another within such field of view.

Within the recent past, such process has been automated so that such process which is called frame-to-frame differencing can take place within an extremely short period of time. Also, the signal levels of the differences between such frames can be utilized in conjunction with a cathode ray tube to provide a visual display of whatever motion may have occurred within the particular field of view.

As will be realized by those persons skilled in the art, such frame-to-frame differencing requires that the several frames to be compared by being subtracted from each other must correspond very precisely to insure that there is no change in the relationship between the detector array and the field of view for the several frames. That is, any physical motion due to the lack of a firm, stationary mounting means or platform for the detector array and its actuating means, if such there be, will produce a difference signal between the compared frames which, of course, is not related to the motion of a target within the field of view. Such erroneous difference signals render the results meaningless or at least less than optimal for the intended purposes.

OBJECTS OF THE INVENTION

In view of the foregoing, it is an object of the present invention to provide a moving target indication system wherein there is means for determining any misalignment between different frames, and for adjusting the apparatus accordingly so as to insure complete and accurate comparisons between several frames.

It is a further object of the present invention to provide a moving target indication system as characterized above wherein the alignment or adjustment means for succeeding frames is operable during the scanning process with a linear detector array, such that corrections can be made to the apparatus after only a very small portion of the scan for developing the succeeding frame has been completed.

A still further object of the present invention is to provide a moving target indicating system as characterized above wherein extremely small state of the art detectors are employed in a linear array, and wherein such array is swept across a field of view to obtain signals corresponding to the characteristics of such field.

A still further object of the present invention is to provide a moving target indication system as characterized above wherein a feedback loop is employed for substantially continually making adjustments as to any misalignment between succeeding frames, such loop possibly including an actuator which responds to a misalignment or correction signal.

A still further object of the present invention is to provide a moving target indication system as characterized above wherein detector signals from preceding scans are stored, and thereafter succeeding scans or a portion thereof are compared therewith to determine any misalignment, the misalignment signal being used to correct any appropriate actuating means for returning the scanning apparatus to accurate alignment with frames from the preceding frames.

An even further object of the present invention is to provide a moving target indication system as characterized above wherein piezoelectric or electromagnetic actuators may be employed to reposition the detector array or to reposition optical elements related thereto so as to change the relationship between the detector array and the field of view to make the necessary correction.

Another even still further object of the present invention is to provide a moving target indication system as characterized above wherein the misalignment or misregistration signal can be employed to monitor or adjust electronic apparatus in said systems to thereby compensate for the misalignment or misregistration.

A still further object of the present invention is to provide a moving target indication system as characterized above wherein a relatively simple and rudimentary mathematical equation can be solved either manually or with appropriate modern day tools and equipment so as to quickly and accurately provide a signal which relates to the amount of misalignment or misregistration.

An even still further object of the present invention is to provide a moving target indicating system as characterized above which is dependable in operation "on the fly".

BRIEF DESCRIPTION OF THE DRAWINGS

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 2 is a perspective view of a first embodiment of a scan correcting device for use in the system of FIG. 1;

FIG. 3 is a diagrammatic illustration of a second embodiment of a scan correcting device for use with the subject moving target indication system; and FIG. 4 is a diagrammatic presentation of another embodiment of the scan correcting device of the system of FIG. 1.

DESCRIPTION OF THE PREFERRED EMBODIMENT

Figure 1:
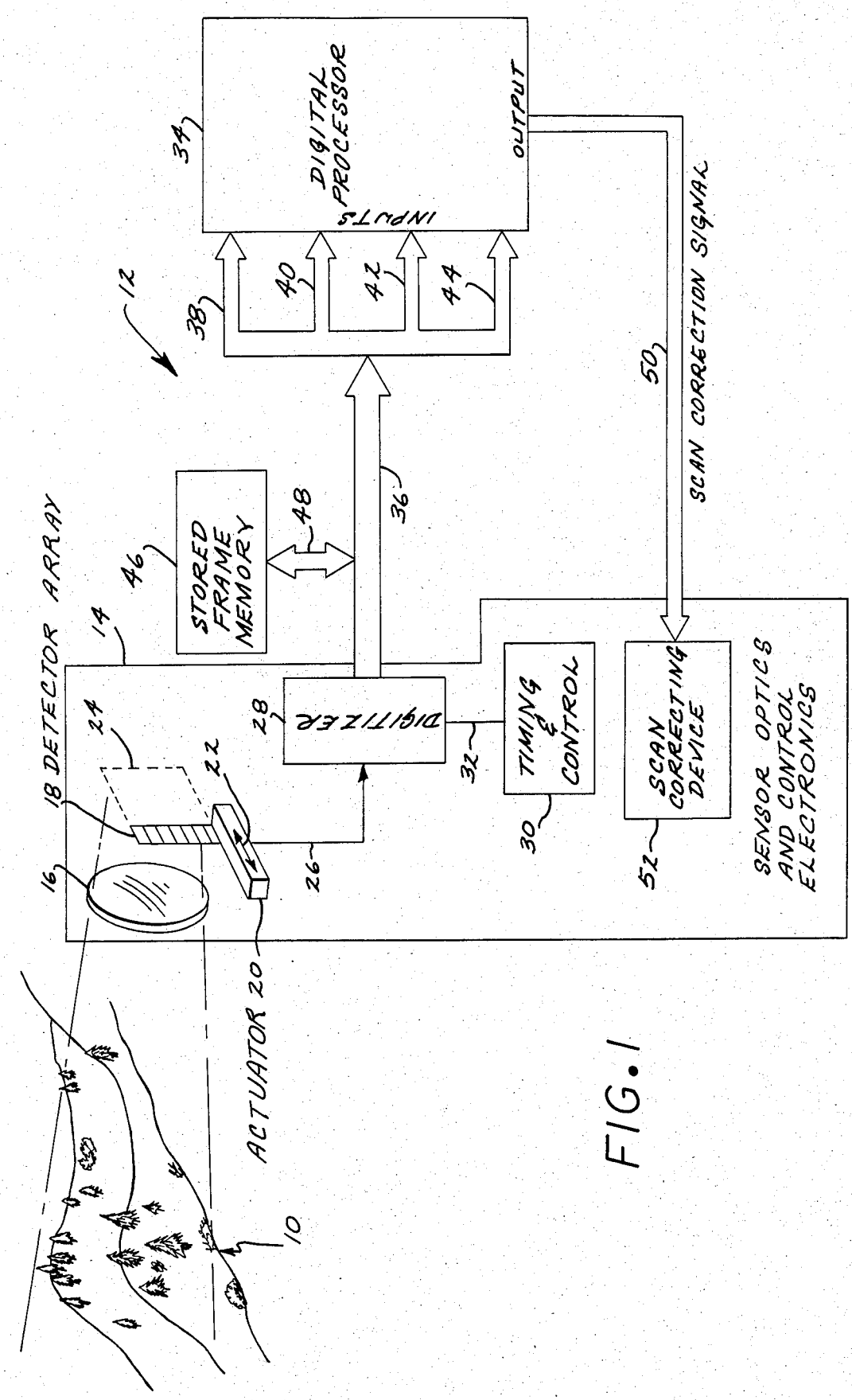
FIG. 1 is a block diagram of a moving target indication system according to the present invention.

Referring to FIG. 1 of the drawings, there is shown therein a field of view 10 which is represented by a showing of trees, hills and the like, to be viewed by a moving target indication system identified generally with the numeral 12. The system 12 is intended to constantly monitor or view the field 10, and to provide a visual or other type of indication of movement within the field of view 10. Although not shown in the drawings, the subject system might employ both visual and audible indication means to provide one or more indications of the fact that something or someone has moved within the field of view 10. Any such indicating means may be employed, as desired, it merely being necessary that such means or apparatus be responsive to electrical signals developed by the subject system as understood by anyone skilled in the art.

The subject system 12 comprises a unit 14 which includes sensor optics and control electronics. That is, it includes imaging optics as represented by lens 16, and may include a myriad of different optical devices such as lenses, mirrors and the like. Such optical system 16 is employed to provide means through which appropriate detection means may view the field 10. In this regard, it is contemplated that substantially any desired optical means may be employed in the system 16 such as telescopic and the like.

For sighting the field of view through the optical system 16, there is provided a linear detector array 18 carried by appropriate scan actuating means 20 for moving the detector array relative to the field 10. In this regard, it should be noted that although mosaic arrays can advantageously employ the subject misalignment or misregistration means in a frame-to-frame differencing system, as will hereinafter become more apparent, the subject system is uniquely well suited to the use of a linear array such that frame-to-frame misalignment or misregistration can be identified and determined during the scanning process. That is, the subject system is so capable of detecting and quantifying such misregistration or misalignment at the end of only an extremely small portion of a second scan, that correction can be made virtually at the outset of the second or any other succeeding scan such that the system is capable of being used "on the fly". That term is intended to mean that as the succeeding scans are being made with a linear detector array, virtually the smallest amount of repeat data or detector information can be used to correct the misalignment or misregistration, and therefore, the registration is virtually constantly being analyzed and monitored. It is important to realize that the subject invention is uniquely suited to use with a linear detector array in a field-of-view scanning procedure to be useable "on the fly" throughout a period of operation.

As indicated by the arrow 22, the actuator 20 for the array 18 is capable of moving the array in linear opposite directions to provide an area of coverage as indicated by the broken lines 24. Thus, the actuator 20 causes the detector array 18 to cover the area indicated by such broken lines.

The manufacture of detector elements has progressed to the point where today it is possible to build a linear array having on the order of a minimum of approximately 250 linearly aligned detectors which are themselves approximately 0.002 to 0.005 centimeters square. Thus, the distance between centers of such detector elements is on the order of 0.002 or 0.005 centimeters. It thus follows that even a slight change in the relationship between the detector array and the field of view from one frame to another will cause different signal samples to be generated in any detector on successive frames. Since the purpose of frame-to-frame differencing is to subtract one frame from the other so as to erase or reject all of the background clutter pattern and thereby leave only a signal for a moving target, it is necessary that the several frames be in substantially complete registration. When such registration is not present, excess "leakage" of the background clutter results through the signal processor. For certain space sensor applications, it has been determined that an rms misregistration of ½ of one percent of a pixel would be all that is tolerable.

Heretofore it did not seem possible to provide such extremely tight frame-to-frame registration with scanning infrared sensors. This was partly due to the scanning function wherein it was desired, if not needed, that the misregistration error would have to be calculated and corrected "on the fly".

The various signals from the infrared detector array 18 are conducted through appropriate means indicated at 26 to a digitizer 28 where such signals are converted to digital information. For controlling the operation of such digitizer, there is provided timing and control means 30 whose output is fed to the digitizer through appropriate conductors 32.

The digitized signals are then fed to a digital processor 34 through appropriate busses as shown at 36, 38, 40, 42 and 44. Also, such signals are caused to be fed to storage or memory means 46 through appropriate buss means 48. The four data busses which afford the various signals to the input of the digital processor 34 are particularized to specific signal information, as will hereinafter be explained in greater detail.

The scan correction signal to be developed and fed back to appropriate control means is represented by the equation $$\delta = \alpha \frac{\Delta}{4} \frac{<(S_A - S'_B)^2 - (S'_A - S_B)^2>}{<(S_A - S_B)^2>}$$

In this equation $S_A$ and $S_B$ are the signal sample values of neighboring pixels in the scan direction, from the subsequent or succeeding scan. This is in accordance with the basic concept of frame-to-frame differencing which requires a first scan and then a subsequent scan. $S'_A$ and $S'_B$ are signal sample values from the same neighboring pixels, but from the stored frame memory which was from a previous scan.

The term $\Delta$ is the nominal spacing between detector samples in the scan direction, and $\alpha$ is a constant related to the sensors and is close to unity. The pointed brackets indicate an average over a sensor-dependent number of pixels such as on the order of 1000.

Laboratory evaluation of the performance of equipment implementing this calculation has shown that when viewing a relatively low contrast scene, and working with only about 1000 pixels of data from each of two frames, image displacement estimates had a precision of about three millipixels.

The output of the digital processor, namely from the above-explained equation, is then fed through appropriate lead wires or buss 50 to a scan-correcting device 52 which may take substantially any desired form such as means to alter the timing of the information received by the digital processor 34 as derived from the second or succeeding scan of the linear array 18. In this regard, such scan-correcting device 52 may physically affect the actuator 20 for the array 18, or it might affect any one of various different parameters of the optics 16 or signal-processing devices to the digital processor 34. It is contemplated within the scope of this invention, that, within the devices or techniques that constitute the present state of the art, substantially any type of feedback or loop-enclosing technique can be employed, as will be readily apparent to those persons skilled in the art.

FIG. 2 of the drawings shows a first embodiment of means for completing such feedback loop. Therein, the image of the field of view is applied to a mirror 60 which then reflects such image to the linear array 18 which is under the influence of actuator 20. The mirror 60 is pivotally mounted on a base 62 by hinge means 64. Interposed between the pivotal mirror 60 and base 62 so as to control the angular position of mirror 60, is any appropriate electroresponsive, motion-producing device 66. Such device might be a piezoelectric crystal or an electromagnetic actuator such that a scan-correction signal impressed across the lead wires 68 and 70 causes repositioning of the mirror 60.

As will be well understood by those persons skilled in the art, such repositioning or adjusting of mirror 60 changes the relationship between the scan afforded by the linear array 18 and the image of the view 10. In this way, the correction signal causes a succeeding frame to be aligned perfectly with a preceding frame so that misalignment errors are eliminated in the frame-to-frame differencing process.

Referring to FIG. 3 of the drawings, there is shown therein another embodiment of the scan-correcting device 52 for completing the feedback loop. Interposed between the detector actuator 20 and the linear detector array 18 is an electroresponsive device which may constitute a piezoelectric crystal for receiving the correction signal from buss 50. It is also contemplated that other responsive devices could be used in place of crystal 80.

Since crystals change their dimension across their entire length, a mounting member 82 is shown interposed between one end of crystal 80 and the detector array 18. That is, mounting member 82 is connected to one end of crystal 80 while the opposite end of the latter is connected to actuator 20. The detector array is not connected directly to the crystal, but rather is connected to the mounting member 82. Thus, a correction signal to the crystal 80 causes change in the physical relationship between the detector array 18 and actuator 20.

FIG. 4 is another embodiment of the scan-correcting device 52. It employs suitable electronic means within the timing circuit for digitizer 28 such as to cause the timing signal which is conducted through appropriate lead wires 32 to the digitizer 28 to be altered in accordance with the correctional signal received from buss 50. As will be well understood by those persons skilled in the art, such correction signal might be applied to the timing controller or any other appropriate component associated therewith, for altering the time sequence of the succeeding or subsequent detector information to be compared with the preceding frame information within memory 46.

It is thus seen that the present invention provides means for determining any misalignment of signals from different frames and for correcting, accordingly, succeeding frame information so as to insure registration of the frames for the frame-to-frame differencing operation. In this regard, it has been determined that because of the particular characteristics of the disclosed system, it is particularly useful for use with scanning devices. The corrections can be performed "on the fly" such that as the succeeding scan is in its initial stages, sufficient information is developed to enable the corrections to take place very early in the second or succeeding scan. Further, it is contemplated that corrections can be made to insure registration from one frame to another in either the vertical or horizontal direction.

Although I have shown and described certain specific embodiments of my invention, I am well aware that many modifications thereof are possible. The invention, therefore, is not to be restricted except insofar as necessitated by the prior art, and the spirit of the appended claims.

I claim:

1. In a moving target indication system wherein a field of view is repeatedly scanned with detection means, the combination of, means for developing and storing information of said field of view from a first scan, means for developing later information of said field of view from a succeeding scan, means for comparing said later information with said stored information from said first scan, and to indicate any difference therebetween, and means for effecting adjustment of said later information to compensate for any misalignment of said succeeding scan as compared to said first scan.

2. In a moving target indication system, the combination according to claim 1 wherein said means for effecting adjustment of said later information includes means for determining said misalignment during any small portion, including the initial portion of said succeeding scan.

3. In a moving target indication system, the combination according to claim 2 wherein said means for determining said misalignment is responsive to corresponding field-of-view information from small portions of said first and succeeding scans.

4. In a moving target indication system, the combination according to claim 2 wherein the means for effecting adjustment includes means responsive to said signal to alter the information of said field of view obtained during said succeeding scan.

5. In a moving target indication system, the combination according to claim 4 wherein said scans are performed by apparatus for effecting viewing scans of said field and said adjustment means is responsive to said misalignment to change the viewing scan for said later scan as compared to said first scan.

6. In a moving target indication system, the combination according to claim 5 wherein the means for developing said information of said field of view comprises a linear array of detectors which are moved across said field normal to the length of said array, and wherein said information is the result of periodic sampling with said detectors during such movement of said array.

7. In a moving target indication system, the combination according to claim 6 wherein by comparing such periodic sampling with said detectors over a predetermined portion of the scan movement of said several scans with said detector array affords a correction signal of the misalignment of said first and succeeding scans.

8. In a moving target indication system, the combination according to claim 7 wherein the means for effecting adjustment includes means responsive to said signal to alter the position of said linear array during such succeeding scan.

9. In a moving target indication system, the combination according to claim 8 wherein said signal is used to adjust the succeeding scan to correct for such misalignment.

10. In a moving target indication system, the combination according to claim 9 wherein the means for effecting adjustment includes means responsive to said signal to alter the physical relationship between the linear array and the field of view.

11. In a moving target indication system, the combination according to claim 10 wherein said signal is obtained from the equation of $$\delta = \alpha \frac{\Delta}{4} \frac{<(S_A - S'_B)^2 - (S'_A - S_B)^2>}{<(S_A - S_B)^2>}$$

wherein $\delta$ is the correction signal and $S_A$ and $S_B$ are the sensor signal sample values from adjacent samplings during the succeeding scan and $S'_A$ and $S'_B$ are corresponding signals of sample values from the first scan, and $\alpha$ and $\Delta$ are constants.

12. The method of providing an indication of movement within a given field of view comprising the steps of,
    causing field-of-view scanning apparatus to perform a first scan thereof and to determine information accordingly of said field,
    storing said information from said first scan,
    causing said scanning apparatus to perform a succeeding scan of said field and to determine information prevailing at the time of said succeeding scan,
    comparing a predetermined portion of the information from said succeeding scan with the information of the corresponding portion of said first scan and developing therefrom a signal indicating the misalignment of said predetermined portion of said succeeding scan with the corresponding portion of said first scan,
    and correcting the remaining portion of the information of said succeeding scan so that it can be accurately compared with the corresponding portion of the information from said first scan.

13. The method according to claim 12 wherein said misalignment signal is derived from a comparison of the scan information from areas of the field of view where no changes have taken place between said first and succeeding scans.

14. The method according to claim 13 wherein the step of correcting includes changing the relationship between the scanning apparatus and the field of view.

15. The method according to claim 14 wherein the step of correcting includes changing the timing of the signals derived from said succeeding scan for proper comparison of the information from said scans in a frame-to-frame differencing process.

16. The method according to claim 15 wherein the step of correcting includes solving the following equation $$\delta = \alpha \frac{\Delta}{4} \frac{<(S_A - S'_B)^2 - (S'_A - S_B)^2>}{<(S_A - S_B)^2>}$$

wherein $S_A$ and $S_B$ are signal values from adjacent pixels in a succeeding scan and $S'_A$ and $S'_B$ are signal values from adjacent pixels in a first scan, and $\alpha$ and $\Delta$ are constants.

* * * * *